May 10, 1966 D. E. KILLEN 3,251,048

MAGNETIC TAPE TRANSPORT SYSTEM

Filed Feb. 28, 1962 8 Sheets-Sheet 1

INVENTOR.
DONALD E. KILLEN

BY S.C. Yuter

ATTORNEY

May 10, 1966 D. E. KILLEN 3,251,048

MAGNETIC TAPE TRANSPORT SYSTEM

Filed Feb. 28, 1962 8 Sheets-Sheet 2

INVENTOR.
DONALD E. KILLEN

BY

ATTORNEY

MAGNETIC TAPE TRANSPORT SYSTEM

Filed Feb. 28, 1962 8 Sheets-Sheet 3

INVENTOR.
DONALD E. KILLEN
BY S.C. Yuter
ATTORNEY

May 10, 1966 D. E. KILLEN 3,251,048

MAGNETIC TAPE TRANSPORT SYSTEM

Filed Feb. 28, 1962 8 Sheets-Sheet 4

INVENTOR.
DONALD E. KILLEN

BY S.C. Yuter

ATTORNEY

May 10, 1966 D. E. KILLEN 3,251,048

MAGNETIC TAPE TRANSPORT SYSTEM

Filed Feb. 28, 1962 8 Sheets-Sheet 5

INVENTOR.
DONALD E. KILLEN

BY S.C. Yuter

ATTORNEY

May 10, 1966 D. E. KILLEN 3,251,048

MAGNETIC TAPE TRANSPORT SYSTEM

Filed Feb. 28, 1962 8 Sheets-Sheet 6

INVENTOR.
DONALD E. KILLEN

BY S. C. Yuter

ATTORNEY

INVENTOR.
DONALD E. KILLEN
BY S.C. Yuter
ATTORNEY

INVENTOR.
DONALD E. KILLEN

BY S. C. Yuter

ATTORNEY

United States Patent Office 3,251,048
Patented May 10, 1966

3,251,048

MAGNETIC TAPE TRANSPORT SYSTEM

Donald E. Killen, Pompton Lakes, N.J., assignor, by mesne assignments, to Minnesota Mining and Manufacturing Company, St. Paul, Minn., a corporation of Delaware Filed Feb. 28, 1962, Ser. No. 176,272
9 Claims. (Cl. 340—174.1)

This invention relates to a tape transport, and particularly to a transport means for feeding a magnetic tape at high speeds past a magnetic transducer, for transferring a magnetic signal from the transducer, such as a recording head, to the tape, or conversely, for reading a magnetic signal from the tape through the transducer as a reading head.

The magnetic tape transport that is used for data transmission, either for recording or for reading, is usually the slowest operating apparatus in the system in which it is employed. For example, when the tape transport is used with a computing system, the associated computing equipment is capable of operating at a very high speed, much faster than the normal conventional speed of the tape transport.

The problem of increasing the speed of the tape transport has been, and is still, therefore, one of the major problems in such transport apparatus that is to be used with computing equipment and the like.

Commercial magnetic tapes are formed on a base of insulating material such as Mylar or acetate, having a thickness of about 0.001 to about 0.002 inch with a superimposed thin layer of magnetic iron oxide of about 0.0002 to 0.0004 inch in thickness. These base materials have a certain amount of elasticity, even though limited. Because of the thinness of the base material, the mass is also relatively small. In moving such tape at relatively high speeds, past the operating magnetic heads with which the tape is to function, a certain minimum pulling force must be applied to the tape which causes a certain small amount of tension in the tape.

Thus, the tensioned tape has an internal stress or force which is present and normally capable of affecting the mass of the tape in a manner to cause vibration.

In the study of vibration as a general phenomenon, the basic quantities of force and of mass are the fundamental quantities or parameters to be considered. In the usual study of this phenomenon, the action of a spring and a mass connected to the spring are considered as a system which is set into vibration upon the application of a small external force which is sufficient to stress the spring, with the force in the spring then contributing to the subsequent movement of the system, now defined as vibration.

A similar condition occurs in the tape as a system. When a tape is started from rest and accelerated to its operating speed through the tape transport and past a transducer or head assembly, the pulling force causes tension in the tape. During the starting interval, such tension is maximum, and some stretching results until the tape is started into motion. Such stretching breaks and reduces static friction between that tape and a supporting surface. Upon starting, the stretching tension will cause the tape to overshoot its operating speed and to undergo a slight longitudinal compression or restoration effect, due to relaxation of the internal stretching stress. The tape may thus experience one or more such stress and form reversals or oscillations, during the starting period, particularly, and similarly also during the deceleration or stopping period. Such oscillations constitute vibrations in the tape, and they occur whenever stresses are developed in the tape in motion and as a free body.

The vibration in the tape manifests itself as a flapping or fluttering of the tape during movement. As the traveling speed of the tape is increased such flapping or fluttering also tends to increase, since increased speed is a function of increased tension.

The increase in speed of the tape is essentially the result that is desired from the improvements in the transport. Since such increased speed in the tape is attended by increased tension and by these various manifestations of vibration, the problem which must essentially be solved is to prevent or to suppress the vibration due to the increased speed of the tape so that the advantages of the increased speed may be obtained and retained, without suffering loss of accuracy because of the flapping or fluttering of the tape with respect to the reading or the recording heads.

A primary object of this invention, therefore, is to provide a tape transport in which a tape travelling through the operating or data transfer zone of a transport may be controlled to prevent or to suppress vibration in the tape at increased speeds.

The general approach to the prevention of vibration, in the analyses of vibration as a problem, has been to provide some sort of damping, in which an external counter-force is provided to react against the force or forces that are causing, or that tend to cause, the vibration.

The manner in which to establish such damping forces, and the manner in which to apply such damping forces, are in themselves the problems which confront the improver of transport apparatus.

In order to achieve proper transfer of information between the tape and the head, either in recording or in reading, the tape must be completely free of vibration within the operating region of the transport, adjacent the heads, so that there will be no variation, or at least a minimum of variation, in the spacing between the tape and the head for proper signal transfer. Vibration, or the flapping and fluttering, of the tape, while the tape is passing through the operating region, adjacent the heads, can result in loss of signal information, or sufficient degeneration of signal information to possibly cause an ambiguous result.

In addition to increasing the operating speed of the tape to save time during the data information or signal transfer periods, it is also important to thus achieve time saving by a decrease in the time that would be required to accelerate the tape to operating speed and to decelerate from such operating speed.

A tape may be accelerated and decelerated hundreds of thousands of times during a day. These time inervals are wasted, since no data or signal transfer can be made during those intervals. Much time is thus saved by decreased these time intervals. Also less tape is wasted.

The primary object of the present invention is therefore to provide a tape transport of improved construction and design, wherein the tape, even when travelling at very high speed, is completely controlled to prevent any vibration, especially during acceleration and during deceleration, with consequent elimination and prevention of flapping and fluttering that would move or shift the tape in any way from its natural intended position, in a specific path adjacent the cooperating selected magnetic head, for reading or for recording.

Because of the basic requirements of the mechanism and of the functions that are necessary for the movement of tape from the one reel to the other, many tape transports may seem to bear a superficial resemblance to each other, even through their differing functions. Many of the functions and elements, that are basic essentials, are found in common in the conventional transport for tape. Thus, for example, a tape transport will include a main or supply reel, with its load of tape, which is to be processed, by movement through a predetermined path and past a reading or a writing head, and is then delivered onto a second or storage reel to be collected thereon.

However, the handling of the tape in its passage from the supply reel to the storage reel varies in accordance with the philosophy and the construction and design of the transport apparatus. In the apparatus disclosed herein, the manner in which the tape is controlled permits the tape to be driven effectively at high speed.

In the apparatus of the present invention, the tape moves, in sequence, from the supply reel over a tensioning capstan, thence into a temporary storage bin to provide a desired amount of slack, thence through a main guide control unit, where the tape is engaged by the reading and the writing heads, as selected, to establish the desired transfer of information, to or from the tape, thence into a second storage bin for temporary accumulation to provide a desired amount of slack, and then from that second bin onto the collecting or storage reel.

The guide control unit provides the major features of the present invention. This guide control unit includes two closely spaced oppositely rotating drive vacuum capstans with perforated peripheral surfaces to support and guide and pull a tape through the operating zone of the apparatus. The tape path through such operating zone is closely parallel to the common tangent line across the tops of the two oppositely rotating drive capstans, and is in the space below such common tangent line and above the line between the centers of the two capstans. Due to such close spacing between the drive capstans, the length of the operating path is a minimum. Within this operating path the tape is controlled to prevent vibration, and also within this operating path the transducer heads are disposed closely adjacent the path to be traversed by the tape.

Each drive capstan has its perforated periphery connected to a vacuum source, to hold a moving tape progressively to the rotating peripheral surface of the capstan. A relay-operated pinch roller operates, upon command, to grip the tape to the selected drive capstan to drive the tape in the desired direction.

Below and at the tape path between the two drive vacuum capstans is disposed a guide support, extending closely to the peripheral surfaces of the two drive capstans. This guide support is perforated on its top surface and is connected to a vacuum source to apply a control vacuum to the perforations as the tape travels over said guide support in movement between the two capstans.

A very short distance of tape travel path, less than one-half inch, is defined between each end of the guide support and the adjacent drive capstan. The transducer head or head assembly has an air gap which is disposed adjacent each such short distance of tape path. Thus, each end of the short tape length that bridges a head or head assembly is held down by a vacuum surface, one end on the guide support and the other end on the periphery of the capstan.

In the present invention, the two reels that are employed are of relatively light weight, with a metallic cylindrical shell or hub and with two sidewalls of lightweight material of relatively low mass, but of adequate strength to retain the mass of tape when it is completely wound on the reel. However, since the tape movement through the operating zone is independent of the rotation of the reels, the weight of the reels is not critical in this system.

The tensioning capstan which guides the tape from the supply reel or from the storage reel into the associated bin, is of special design and function, and constitutes one of the features of the present invention. This capstan is a vacuum controlled guide capstan, including a perforated roller, turning within an uncompleted cylinder of shielding material that covers the non-operating perforations of the roller, and exposes the peripheral area of the perforated roller that moves progressively into engagement with the tape being advanced by the roller. The shield may be made of any suitable material, metallic or non-metallic, to serve as a shield to cover the non-operating perforations. When the shield is made of a plastic non-metallic material, such as the tetra- or tri-fluoro-ethylene compounds, for their lubricating surface qualities, the material may be loaded with appropriate conducting material to provide charge leakage and thus prevent accumulation of static electrical charges. A metallic shield will provide its own charge leakage path. Other charge leakage devices such as filament brushes may be employed.

The tape travels over and with the perforated cylinder, being air-pulled by the turning roller. The roller surface always moves downward faster than the tape does in coming off its reel, so there is some relative movement between the turning roller and the tape at all times. The inside of the perforated roller is connected to a vacuum system which serves to hold the moving tape progressively to the surface of the rotating capstan roller. The tape engages the roller over a short arc subtending a small angle, from about 45 to 90 degrees at the center. Suitable butterfly valve means are provided with the perforated cylinder to shut off the vacuum in the tensioning capstan under certain conditions. The uncompleted shielding cylinder substantially encloses the rotating perforated roller over the entire area of the perforated roller that is not covered by the moving tape. The shielding cylinder thus serves as an air seal for the otherwise uncovered part of the perforated roller.

The dielectric base of the tape engages that capstan roller, and, from that capstan roller, the tape drops into a compartment or bin, where the tape accumulates in a pile of random serpentine loops to a level normally controlled, in this modification of the machine, to about the mid-level height, to supply an amount of substantially free body tape that may be drawn on for fast movement through the guide control unit for the reading or the writing operation.

The construction of the bin for accumulating the tape is another feature of this invention. A catenary suspension or stirrup is supported within the bin, from two pivot points, to receive and store the loose serpentine folds of the tape to the mid-level height to be controlled by the circuitry. The suspension or stirrup may be formed from any suitable, flexible material or relatively light weight thin stock in order to provide a support of minimum mass that can be easily displaced within the plane containing the two stationary suspension supports and the suspended stirrup material itself.

When the tape material is to be drawn from the bottom level of the accumulated pile of serpentine loops and folds, the initial tension impressed on the strip of tape that is disposed as the bight of the lowermost fold, will be applied in a line laterally displaced from the center of mass of the pile of serpentine folds.

The initial tension on that tape section or bight at the bottom of the pile of serpentine folds is therefore effective through its moment arm, with relation to that center of mass, to cause the serpentine folds to tumble in the opposite direction to shift the mass center, and thereby, to increase the length of that moment arm. The accumulation of serpentine folds thus acts in the manner of a mass of free roller bearings, to shift the center of mass with the result that the accumulated mass of serpentine folds of the tape provides a pushing lateral force component that tends to move the bottom section or bight of tape in the direction in which the initial tensioning force tends to move the tape. The accumulated mass of slack, as herein supported in the dynamic bin, serves, when tilted, to aid the initial pulling tension on the tape in the bin.

Considered from another point of view, the catenary support or stirrup which supports the tape is relatively stable in its static condition and the center of mass of the accumulated serpentine folds is on, or very close to, the vertical center line of the catenary suspension. The catenary with its load of serpentine loops may be considered to be an inverted truncated cone in a relatively stable position. When the initial tension force is applied to withdraw the bottom layer or bight of the bottom serpentine loop, the stable truncated triangle is essentially tipped to an unstable position so that the center of mass of the accumulated serpentine loops no longer acts as an equivalent mass to press vertically on the lowermost loop, but, instead, due to its lateral displacement, presents a laterally displaced gravity force which has a component acting tangentially on the inner periphery of the catenary to tend to push the bight of the bottom serpentine loop in the direction in which the apparatus is already acting to move the tape.

The catenary suspension construction in the bin thus provides an arrangement which is automatically operative to adjust itself, and to adjust the center of the mass of the accumulated serpentine loops, to relieve the gravity pressure and friction on the bottom portion of tape being withdrawn from the catenary suspension, and to aid in pushing that bottom layer of tape from the suspension to the guide path adjacent the operating heads.

These two effects, namely, the relief and easing of pressure on the lowermost layer of tape, and the establishment of an equivalent pushing force, are particularly important when a pulling force is initially applied to the tape. By the easing of pressure, the usual friction, as is found in a conventional static bin, is here substantially reduced. The practically simultaneous development of an aiding pushing force, to act on the bottom layer of tape being withdrawn, makes that bottom layer essentially a free body, without frictional restraint, and thus enables that layer, as such a free body, to be rapidly accelerated to operating speed, within the short interval of one and a half milliseconds.

As the tape is now drawn through the guide assembly past the reading and the writing heads, according to the operation called for, the tape moves through a controlled path in the guide control assembly, which operates in accordance with the present invention to enable a high speed of movement to be achieved and maintained in the tape. After the tape moves through the guide control assembly it is then accumulated in a second bin, which is also provided with a catenary stirrup or support for the accumulating tape loops or folds, from which the tape may then be withdrawn to be collected on the storage reel, when the accumulation of tape in the bin exceeds a predetermined amount, generally predetermined at a level at about half the vertical height of the bin.

In connection with the catenary suspension for accumulating the tape, in the course of the reading or writing operation, a further object of the invention is to provide such a bin having a dynamic transfer characteristic that tends to establish an anti-friction operation by tilting the serpentine loops and by thus causing them to act essentially as antifriction elements, to thereby diminish the normal friction that would otherwise exist between the bights of each loop as the bottom section of tape of the accumulated pile is being withdrawn for processing through the guide control assembly.

A further object of the invention therefore is to provide a supporting system that spills or agitates the accumulated serpentine loops of slack tape in order to take advantage of the physical phenomenon which makes moving friction between two sliding surfaces less than the starting friction which must be overcome to achieve motion between those two surfaces.

In order to be able to achieve high speed movement of the tape through the guide control assembly, with accurate signal or data transfer, this invention utilizes a basic principle of vibration analysis.

As previously suggested, in the study of undamped free vibrations of a system, which is here represented by a section of the tape considered as a free body, the vibration that may be developed in the tape is essentially a reaction of the internal stress and the mass of the tape. The stress is developed in the tape by the pulling force, and the mass of the tape is a fixed quantity determined by dimensions and density of the tape with its superposed layer of iron oxide.

The vibration which the tape may sustain will not necessarily be limited to a single frequency such as the natural resonance frequency of the tape. The vibration of the tape is more likely to be a complex function that may be represented by a Fourier series of frequency terms in which the fundamental frequency or resonance frequency of the tape at the existing tension value may represent the basic frequency term of the series.

It is sufficient, however, for the purpose of analyzing the present invention, to consider merely the basic resonance frequency of the tape, since that frequency will be a function of the internal stress, which, in turn, will be a function of the applied tension for pulling the tape through the transport.

For the purpose of analysis of the invention, reference is made to the basic formula relating the natural frequency of the tape, as a system, to its parameters, internal stress and mass, as $$F_n=(1/2\ \mathrm{pi})(k/m)^{1/2}$$

where $F_n$ represents the instantaneous resonance or natural frequency, $k$ represents the internal stress in the tape, and $m$ represents the mass of the tape.

From the formula, it is seen that the natural frequency or possible vibration that may be developed in the tape is directly proportional to the square root of the force and is inversely proportional to the square root of the mass of the tape, or of the system represented by the tape.

The internal stress $k$ may be considered under two conditions, namely, as a steady state force, after the tape is accelerated to operating speed, or as a transient force, while the tape is being accelerated from rest, or zero speed, to full operating speed.

As a transient force, it is effective in the present apparatus in the very short time interval of 1.5 milli-seconds, and is thus effective as a unit pulse, of large amplitude and short duration. The ratio $k/m$ is large during this transient interval and the vibration frequency established in the tape could be large if the mass of the tape were not controlled. Such stress in the tape, if the tape were undamped, could cause a sustained oscillation that could continue into the steady state period until the initial energy pulse would be absorbed.

In the steady state, the internal stress has decreased, but is still substantial in respect to the small mass $m$ of the free tape, so that substantial vibrations could result.

It is at this point that the present invention is provided to take effect. In accordance with the present invention, the small mass represented by the small "$m$" in the formula is essentially increased to an infinite value, in incremental lengths of the tape, as the tape is progressively moving through the guide control assembly in the operating zone. As a consequence, the system is now represented by the tape with such increased mass, as provided by this invention, and the resonance frequency of such instantaneously changed system is reduced to zero.

Thus, with the natural frequency of the system reduced to zero, there is no vibration in the tape, and the speed of the tape may be increased substantially over the maximum speed permitted in a transport, or in a transport system, in which any section of the tape could suffer vibration within an operating zone bridging an operating head to be engaged by the tape.

Thus, one important object of this invention is to provide a tape transport in which the tape is controlled during its movement through the operating zone, so the equivalent mass of the tape is substantially increased to a value that is substantially infinite, with the consequence that the resonance frequency of the tape system in the operating zone is reduced substantially to zero, both in the transient state and in the steady-state condition of the applied force.

Since the tape must, nevertheless have essentially complete freedom of movement, almost as a free body, especially through the operating zone, the enlargement of the effective mass of the tape must be accomplished practically instantaneously and incrementally for extremely small time intervals, so the tape will still retain its essential characteristic as a relatively free body subject to fast acceleration and movement by the applied pulling force that is to move the tape through the guide control assembly.

In order to locate and position the tape for direct movement through the operating zone, the tape is supported from and between the top peripheral arcuate areas of two spaced drive capstans or rollers, one of which serves as a pulling roller for the tape, depending upon the operation and the required direction of movement of the tape, while the other roller serves merely as a support during the movement of the tape. When the tape is moved in the opposite direction, the other roller serves as the pulling roller and the first roller serves as a support roller.

The distance between the centers of the two drive capstans, preferably of equal diameter, determines the length of the operating section of tape between the two drive capstans as the tape is moved progressively through the guide control assembly. The tape path between the two peripheral arcs of the drive capstans constitutes the operating region. As a result of the disposition and arrangement of the two capstans and the path of the tape between them, the operating region is kept to a minimum. Thus, the length of the operating tape section that must be safeguarded against vibration is kept to a minimum.

The magnetic head assemblies, including the reading and the writing heads, are disposed adjacent this operating region that will be traversed by the operating tape section. Since the two magnetic heads themselves must have certain definite dimensions which cannot be diminished, the short length of tape between those two magnetic heads, or rather between the gaps of those two magnetic heads, is essentially a free body that would vibrate, in the absence of the treatment and construction provided by the present invention.

If the tape were free to vibrate in this short space between the heads, such vibrations would feed back and would feed forward to the adjacent regions of the tape traversing the air gaps of the reading and of the recording heads, with consequent degeneration or loss of signal transfer between the tape and the heads.

Another important object of the present invention is to provide a construction in which the operating tape section is controlled to prevent vibration in such operating tape section as the tape passes progressively through the operating region, with the consequence that the tape is prevented from vibrating while it traverses the operating air gap of an active head or head assembly adjacent said operating region.

The tape is controlled, in accordance with this invention, as it passes from one drive capstan to the other. In such passage, the tape is guided and moved over a perforated pneumatic control surface connected to a vacuum souce that tends to hold the moving tape in planar moving contact with such control surface. The vacuum that is operative through the perforations in the pneumatic control surface enables the normal air pressure on the exposed or top surface of the tape to serve essentially as a coupling means, to couple each incremental length of the tape to said control surface, as the tape progressively passes over the many rows of perforations in said surface. At the same time, as each elemental or incremental length of tape passes over a perforation onto a solid elemental area of said control surface, the pneumatic coupling between tape and control surface is broken and the tape is for that small instant essentially disconnected from the control surface and is a free body with its own mass.

While the tape is coupled to the control surface by the pneumatic coupling at a perforation, the effective mass of that elemental length of tape is increased by the mass of the control surface element and the entire structure of the apparatus, since the stationary control surface is essentially supported on the stationary structure of the apparatus. Since the mass of the apparatus and the table is practically immovable, considered with respect to the small internal stress in the small elemental length of the tape, the mass of the control surface and apparatus is essentially infinite, and, as previously explained in analyzing the formula for the frequency of vibration, the resonance frequency of the tape system, including the tape and the related mass is reduced to zero. Thus, no vibration can take place in that free section of the tape that progressively moves across said control surface and through that part of the operating zone of the apparatus.

Similarly, the tape moving with the periphery of each drive capstan of the guide unit is pneumatically coupled to the mass of the drive capstan by the vacuum at the drive capstan, and is there also held against vibration.

The operating zone thus includes a short space of about three-eighths of an inch between the take-off point of the tape from each end of the pneumatic control surface and the tangent point of the tape on each drive capstan. Each transducer head or assembly is disposed with its air gap transverse to the tape path and substantially at the middle of one such short space between the pneumatic control surface and a capstan. Each such short length of tape between the pneumatic control surface and the adjacent capstan is thus further subdivided at the air gap of the transducer into two shorter lengths of unsupported tape.

By reducing the length of free or unsupported tape bridging the air gap of a transducer head, the physical laws are further utilized to suppress and prevent vibration at such air gaps. The poles at the air gap engage and support the tape at the middle of said short bridging section with the tape under constant tension. Each half-length of the bridging section is now doubled in stiffness and further resists any transient tendency to change form in the absence of any change in tension.

Consequently, in accordance with the present invention, each short bridging section of tape is controlled, as it moves over the gap of either operating head, so the two ends of the tape section that progressively bridges the transducer gap will be held in a condition of non-vibration.

Thus, since the tape is controlled to prevent its vibration while moving through the operating zone, between the two capstans and past the two heads, the internal stress in the tape during such pulling movement is ineffective to cause any tape vibration, and the speed of the tape may therefore be safely increased within limits that may be otherwise imposed upon the machine only by associated components. The speed of the tape, as now controlled in accordance with the present invention, is no longer limited by the tendency of the tape to vibrate at its natural frequency in response to the internal stresses developed during the pulling operation upon the tape.

Another object of the invention in order to aid high speed movement of the tape through the transport, is to provide a supply of slack tape in each bin, ready for immediate movement through the control guide upon demand.

In order to provide such adequate supply of slack tape in each bin, each reel is controlled by a suitable servo system to keep the level of accumulated slack tape in the related bin at a predetermined selected level that will assure sufficient slack at the operating speed of the drive capstan. Two light beam producers and two related sensors are disposed to ascertain the level of accumulated slack relative to said predetermined selected level. Those two sensors control a reversible drive motor on the reel through a servo system to maintain a proper amount of slack tape in each bin.

The construction of the transport, and of its various components, and their functions and methods of operation, in accordance with the principles of the present invention, are explained and described in more detail in the following specification, in connection with the accompanying drawings, in which FIGURE 1 is a front elevational view of the tape transport and feeding apparatus;

Figures 4A, 4B, 4C:
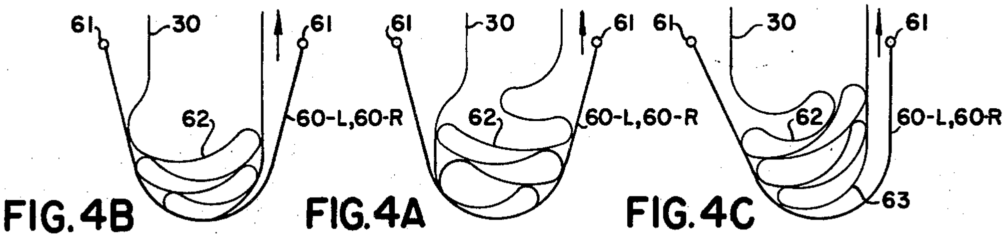
Figure 17:
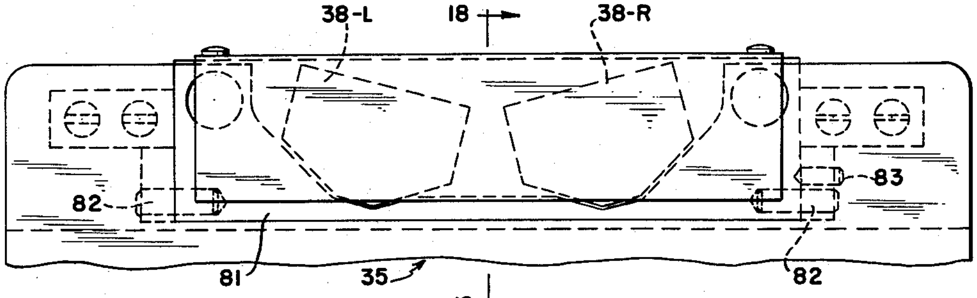
Figure 5:
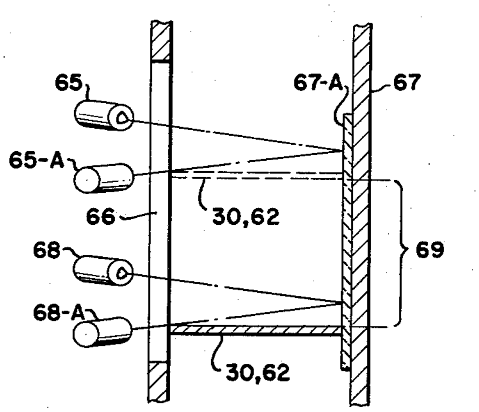
Figure 18:
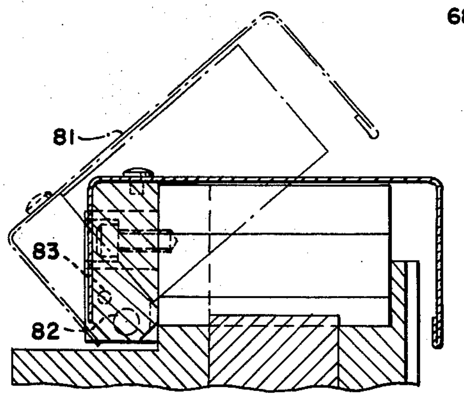
Figures 6, 12, 13:
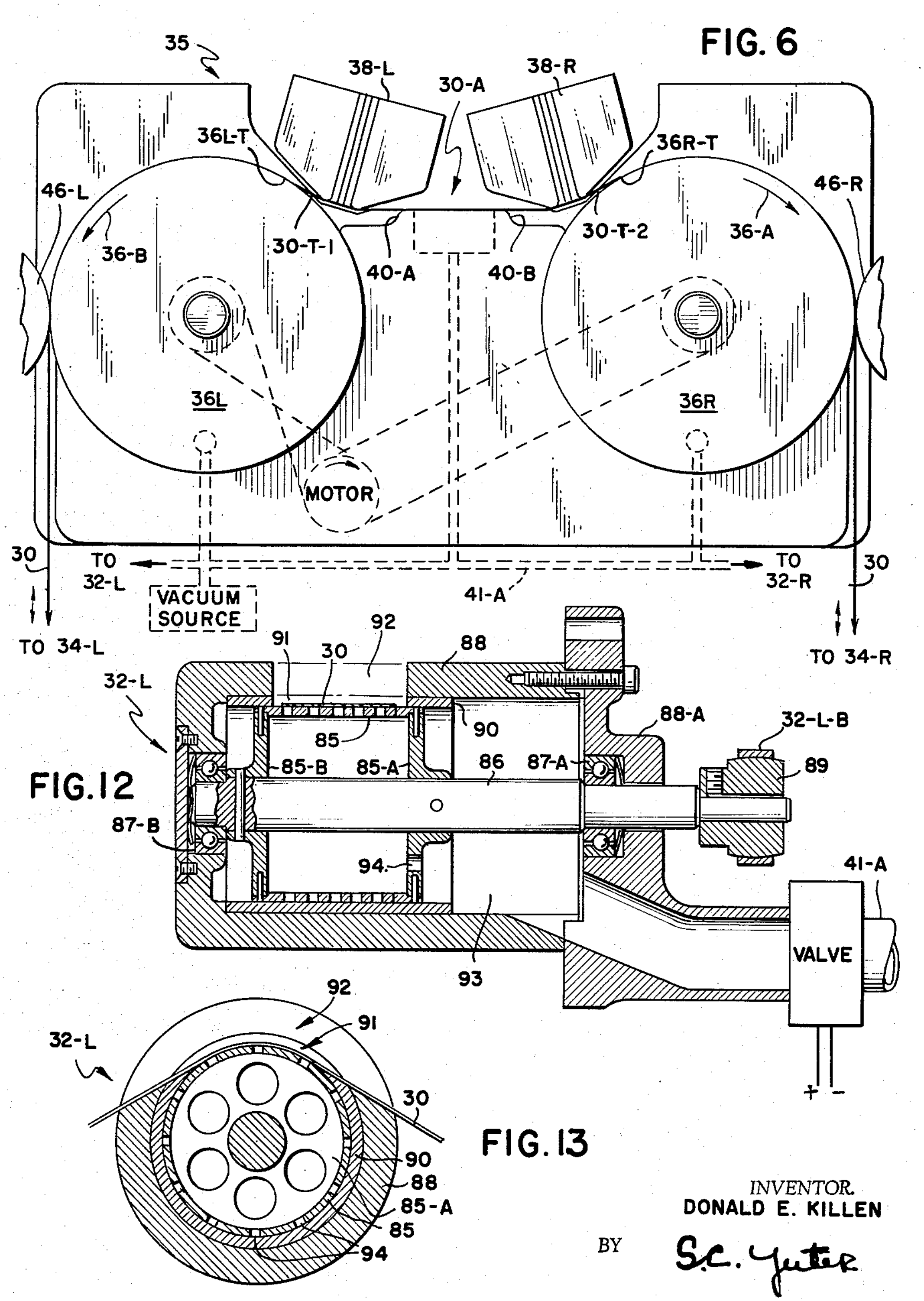
Figure 7:
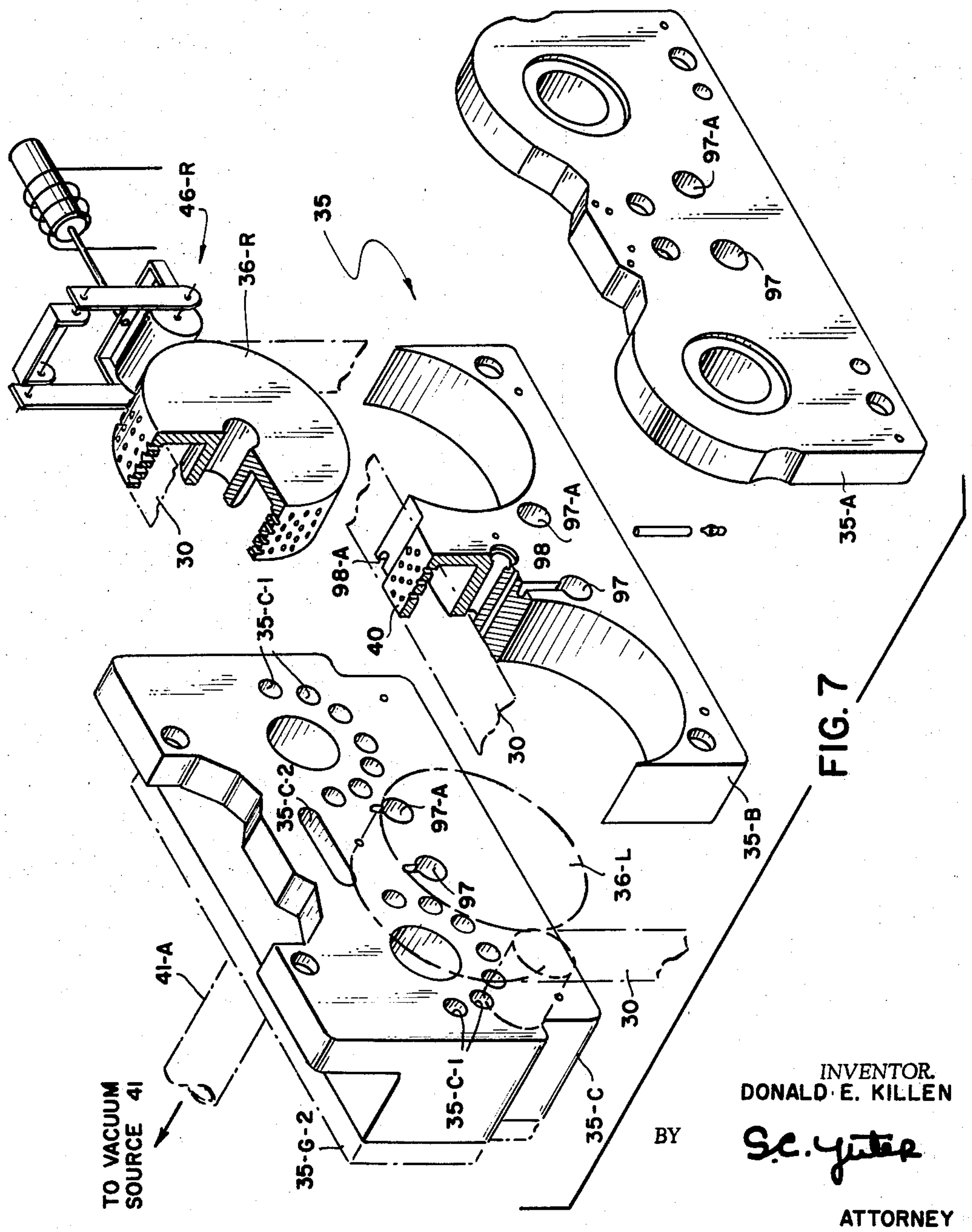
Figure 8:
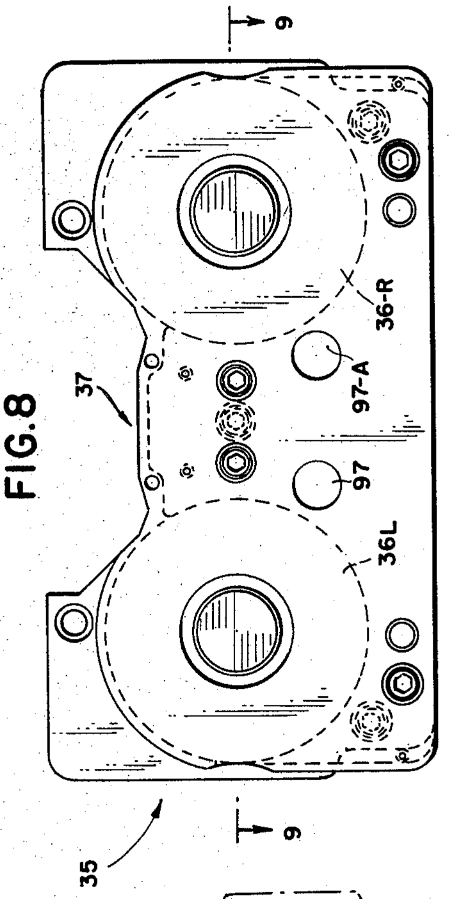
Figure 9:
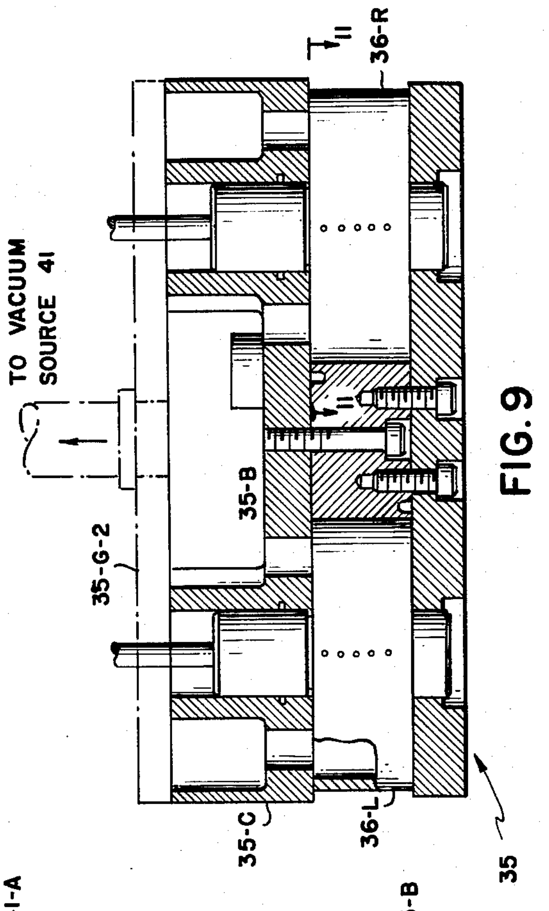
Figures 10, 11:
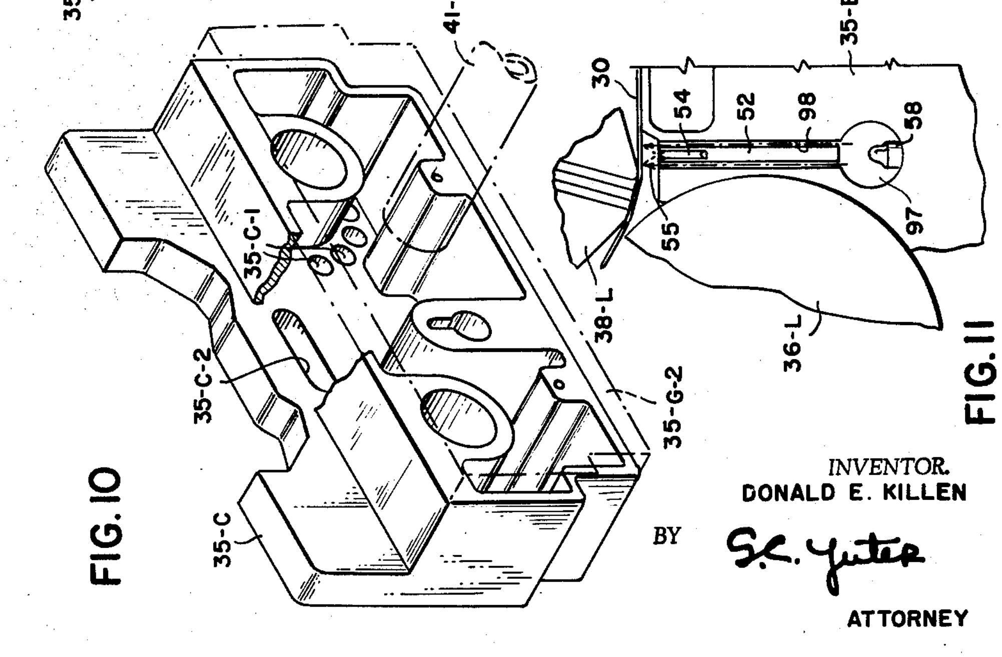
Figure 14:
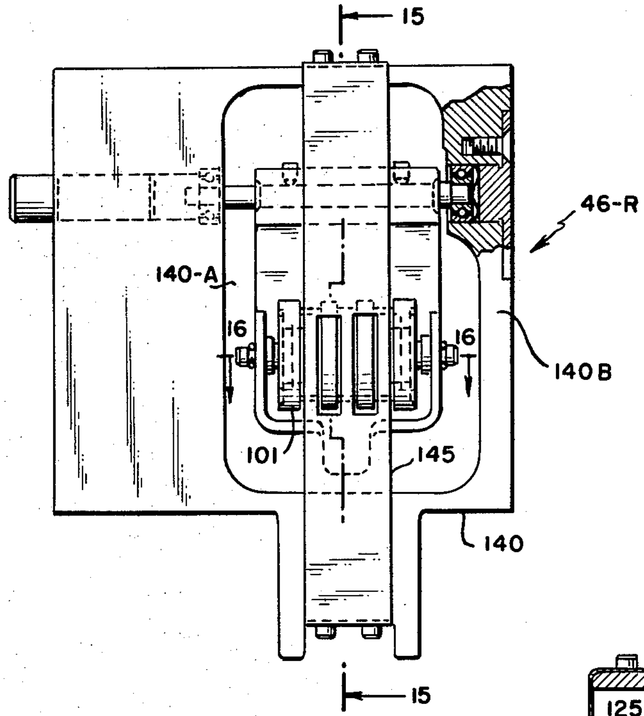
Figure 15:
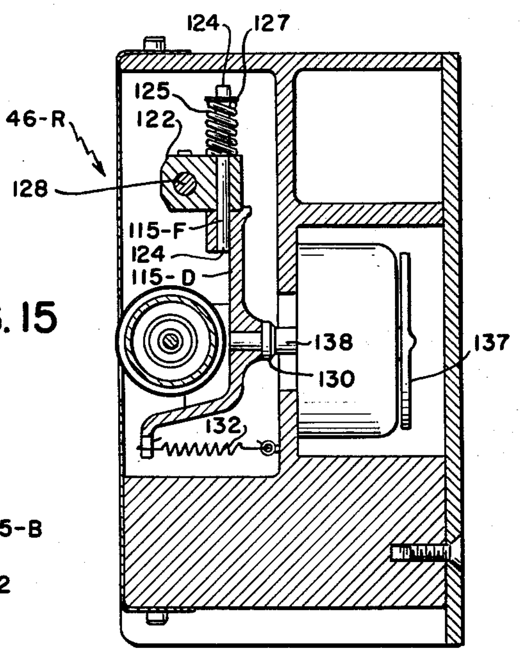
Figure 16:
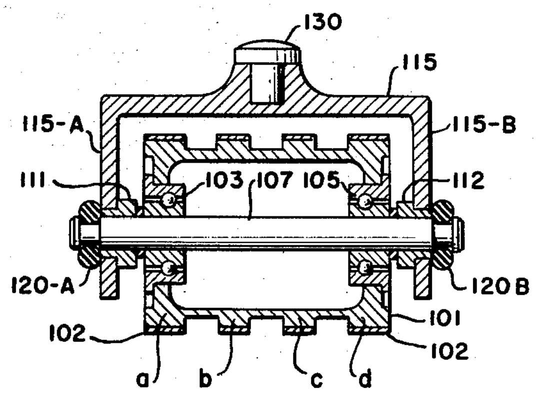
Figure 19:
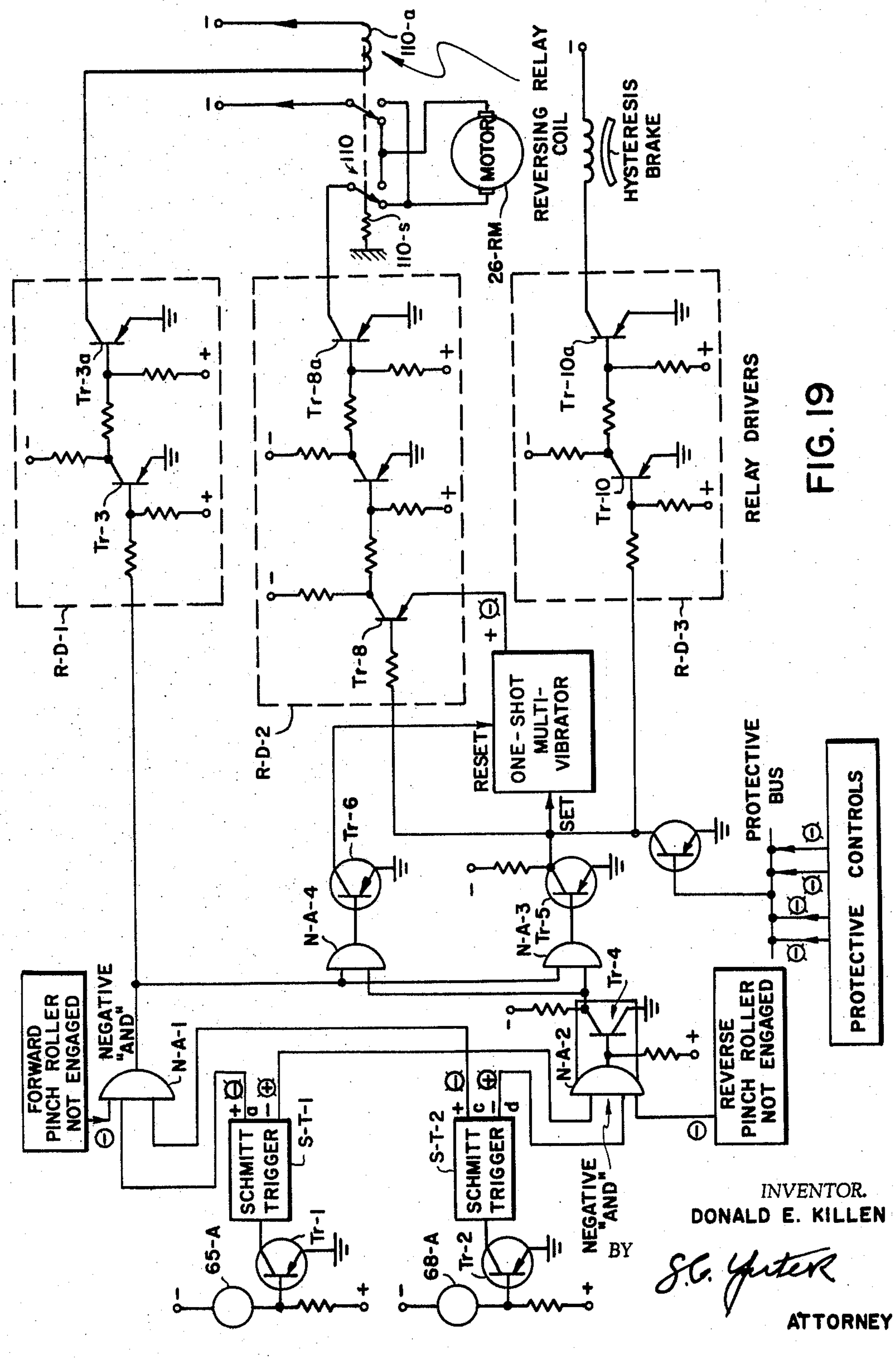

FIGURES 4–A, 4–B and 4–C are schematic views of a basket in the bin for receiving and holding slack tape;

FIGURE 5 is a schematic side view of the optical system for ascertaining the height of the pile of accumulated slack tape in a basket for controlling the related reel according to supply or to withdraw slack tape to the desired level in the basket;

FIGURE 6 is a schematic front elevational view of the control guide assembly for driving a tape, showing relative locations of drive capstans, heads and vacuum pad, and associated pinch rollers, relative to a tape being processed;

FIGURE 7 is an exploded perspective view of the control guide assembly, showing the main parallel guide plates, including the vacuum pad and drive capstans;

FIGURE 8 is a front elevational view of the assembled control guide with the heads removed from operative position;

FIGURE 9 is a downward sectional view on a horizontal plane along line 9—9 in FIGURE 8, and shows the vacuum coupling to the rear of the guide assembly;

FIGURE 10 is a rear perspective view of the rear plate of the control guide;

FIGURE 11 is a schematic and sectional view taken in the plane along line 11—11 in FIGURE 9, with a head shown in normal position to locate the detector for the position marker on the tape;

FIGURE 12 is a longitudinal sectional view of the vacuum tension capstan;

FIGURE 13 is a sectional view through the vacuum capstan of FIGURE 12 to show the passages in one spider for the roller;

FIGURES 14, 15 and 16 are respectively, front elevational, side sectional and horizontal sectional views of the pinch roller;

FIGURE 17 is a front view of the supporting bracket for the head assemblies;

FIGURE 18 is a side view partially in elevation and partially in section to show the tilting motion of the supporting bracket for the head assemblies;

FIGURE 19 is a schematic logic diagram of the servo circuit for each reel and the control sensors in the related bin.

Figure 1:
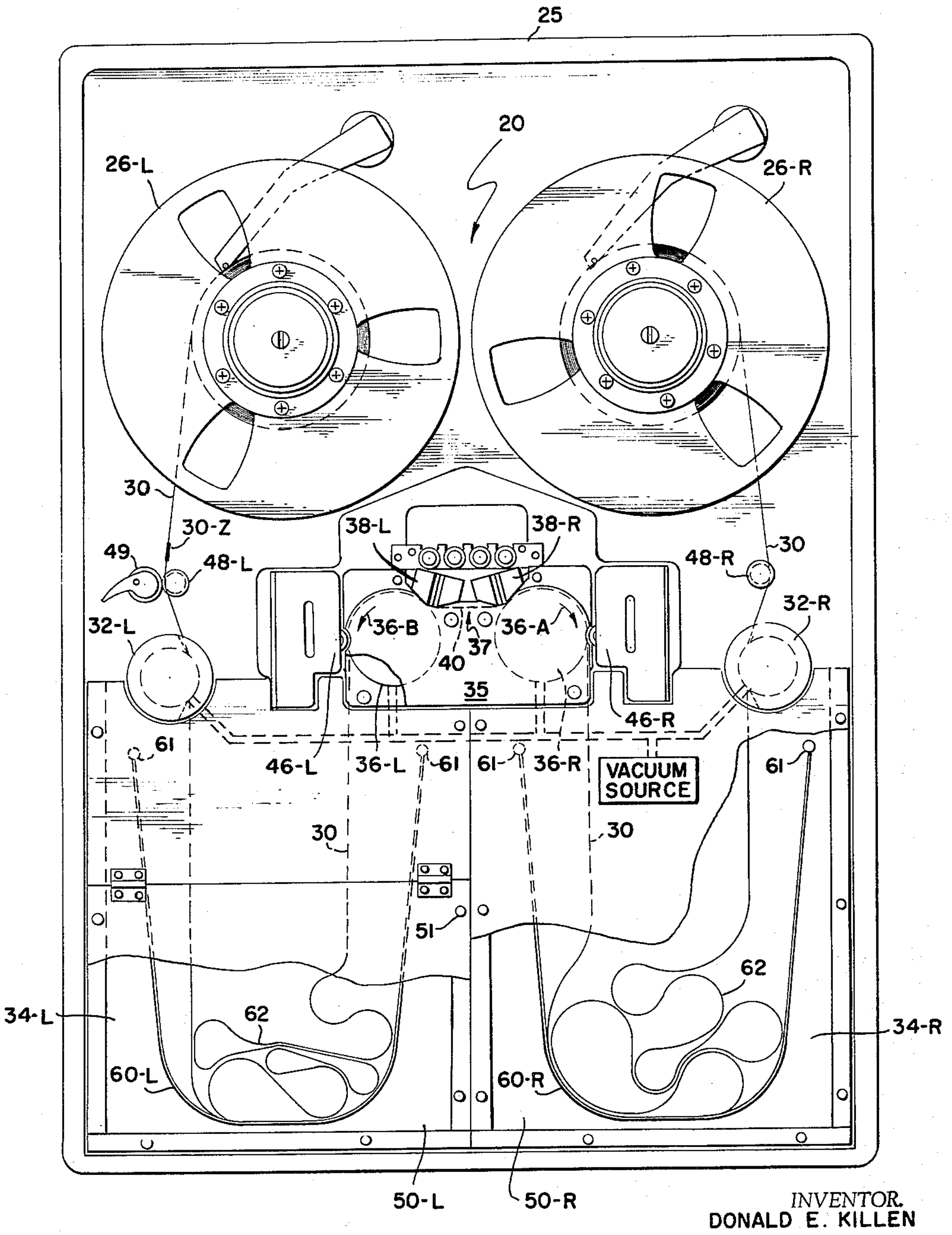
Figure 2:
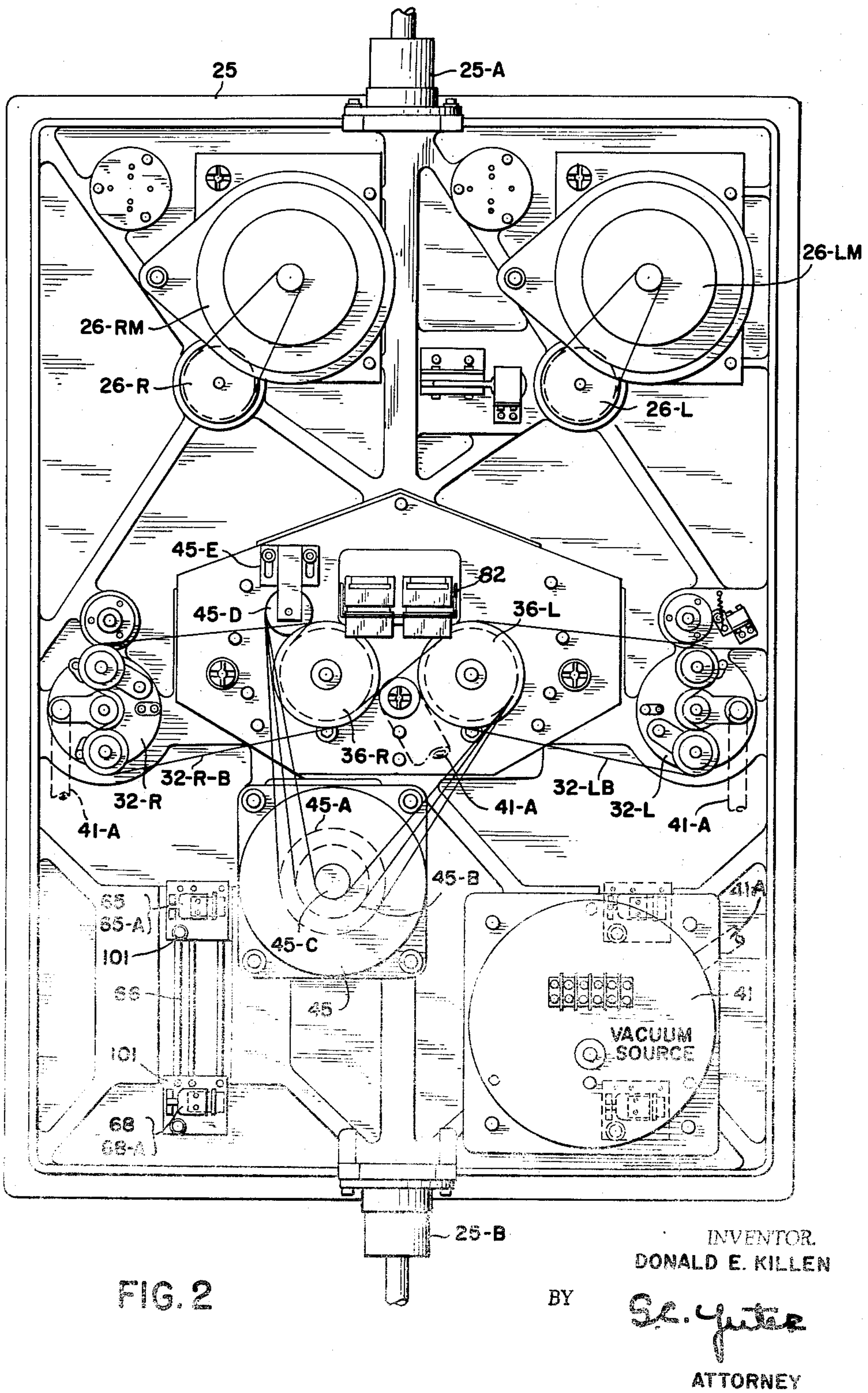
FIGURE 2 is a rear elevation of the panel of FIGURE 1.

As shown in FIGURE 1, the tape transport apparatus 20 is mounted on a pivoted panel 25 which is pivotally supported on its central axis between top and bottom bearings 25A and 25B, better shown in FIGURE 2, to permit the entire panel 25 to be turned through a quarter turn in either direction, in order to enable the panel to be accessible from the front of the apparatus for any necessary checking, adjusting or repair operations.

Two reels, 26L and 26R are supported on the front of panel 25 for rotation by their respective motors 26LM and 26RM mounted on the rear of the panel 25. Reel 26R is the file or storage reel to receive a tape to be processed from the supply reel 26L, which is placed in position on its drive shaft when its tape 30 is to be processed. The tape 30 to be processed by the transport, may be fed from either reel to the other, through a path including two vacuum tensioning capstans 32L and 32R, two associated storage bins 34L and 34R to receive and hold slack tape from which the tape may be drawn to ride through a main control guide 35 in a selected direction across the tops of two vacuum drive capstans 36L and 36R to pass through an operating zone 37 in a path situated between the two drive capstans 36L and 36R. Such operating zone is within the space between the tangent line common to the two capstans and the line between the centers of the two capstans. Two transducers or magnetic head assemblies 38L and 38R each include a writing head and a reading head for specific tracks on the tape and are disposed adjacent said tape path within the region referred to as the operating zone 37, where the tape travels between the two drive captans 36L and 36R.

The short length of tape in that operating zone 37, between the capstans and bridging the gaps of the two head assemblies, is the operating tape section 30A. That operating tape section 30A must be kept from vibrating so the tape may be moved at high speed without loss of signal transfer between tape and heads. To aid in accomplishing such vibration control, a perforated pad or plate 40 is provided and disposed with its top surface adjacent a portion of the operating zone 37 between the air gaps of the two head assemblies. The operating tape section 30A travels across the top of the pad 40 in its passage between the two drive capstans 36L and 36R.

The two drive capstans 36L and 36R are peripherally perforated rollers, and together with perforated pad 40, are connected to a vacuum source 41 in FIGURE 2 to attach the tape. The drive capstans 36L and 36R are continuously driven in opposite directions by a common motor 45, shown in FIGURE 2, at a selected fixed speed. Suitable speed changing means, here shown, by way of example, as three stepped pulleys 45A, 45B and 45C for changing the driving speed of the drive capstans 36L and 36R, and, therefore, the speed of the tape in passage through the operating zone 37. Other forms of speed control may be employed, in steps or continuously variable.

Two pinch rollers 46L and 46R, adjacent the drive capstans 36L and 36R, are magnetically selectively operable through selective switching means to press the tape to either selected driving capstan 36L or 36R to cause the tape to be moved in the corresponding direction of rotation of the engaged rotating capstan. The tape thus driven by either capstan is acted on by the selected head assembly and is then dropped into the associated storage bin 34L or 34R as slack tape, from which excess slack tape is drawn onto the associated reel 26L or 26R, to leave only a predetermined amount of slack in either bin to be immediately available upon demand.

The tape in movement to and from the reels, and from or to the bins, passes over two idler rollers 48L and 48R, which guide the tape to or from the respective reels to or from their respective bins, over the associated vacuum tensioning capstans 32L and 32R. An eccentric clamp 49 is provided adjacent the idler roller 48L to hold a leader 30–Z and to permit the starting end of the tape from reel 26L to be attached to such leader, above clamp 49 which will enable the end of the tape to be threaded through the path between the two drive capstans and the heads of the main control guide assembly.

The leader 30–Z is a length of non-operating tape from the storage or collecting reel 26R, with slack in both bins and threaded initially through the main control guide assembly, to be connected to the operating tape, coming from supply reel 26L, to pull such operating tape from supply reel 26L through the operating path in the control guide assembly 35 and onto the storage reel 26R. The leader is a conventional expedient for starting the operating tape through the transport.

Initially, the leader provides the necessary slack, in either bin, or in both bins, to provide the time interval to enable reel of tape 26L to be brought up to operating speed to enable the operating tape to follow the leader through the slack zone of bin 34L to the control guide.

In such starting operation, the main drive motor 45 is energized to rotate the drive capstans 36L and 36R at constant selected speed in their respective opposite directions shown by arrows 36–A and 36–B. As shown in FIGURE 2, the drive belt may be selectively applied to the selected pulley for the speed desired, with an idler 45–D adjustably movable with its supporting bracket 45–E to compensate for changes in the length of belt path for different pulleys on the drive motor.

When the transport is to be placed in operative condition, the leader is pulled through the control guide 35 by the drive capstan 36R and the associated pinch roller 46R until the appropriate front terminal position of the operative tape reaches a predetermined position at the control guide, which represents a starting or "load" position of the tape.

Figure 3:
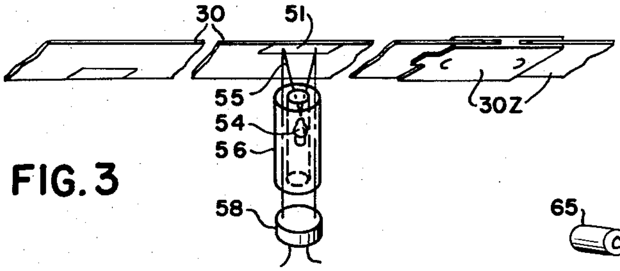
FIGURE 3 is a schematic view of the position marker on the tape and the optical system for detecting the marker at the control guide.

As shown in FIGURE 3, the front terminal position of the tape is provided with a suitable marker that can be readily detected. In this modification of the transport the marker is a reflecting surface formed by a strip 51 of silver painted onto the tape. The presence of the reflecting strip 51 is detected by a photo electric cell 54 when energized by reflection of a radiant light beam 55 projected from the front end of a plastic cylinder 56 which transmits trapped light from a light source 58 to said front end.

When the operating tape reaches such "load" position, the pinch roller 46R may be de-energized. The tape remains in such position ready for service, upon demand through suitable circuitry to re-energize the pinch roller 46R and to move the tape through the control guide past the transducer head assemblies for recording or for reading.

While the driving capstans 36L and 36R are being rotated, the two tensioning vacuum capstans 32L and 32R are simultaneously being driven, by belts 32–LB and 32–RB in FIGURE 2, but at greater speed in a direction to pull tape from the associated reel which is being rotated to dispense tape for slack to the associated bin while the operating tape is being driven through the control guide. Each reel is controlled to dispense tape to the bin or to withdraw and wind tape from the bin according to the amount of slack tape in the bin, so that a predetermined amount of slack tape will normally be in the bin to about half-full height.

In the two bins 34L and 34R are provided two baskets 60L and 60R which are essentially catenary suspensions suspended from stationary pins 61 at their ends to provide space for accumulating a certain length of slack tape in random serpentine folds that will be sufficient to provide the necessary slack 62 when the tape is called on for movement through the main control guide assembly 35, until the associated reel can be accelerated and rotated to proper speed to supply additional slack tape sufficient for the driving speed of the transport.

The magnetic tape transport apparatus shown herein in FIGURE 1 is capable of operation of speeds to three hundred inches per second with fast starts and stops. This is made possible by a number of things—first of all the main drive assembly eliminates as much static friction as possible, and also eliminates as much distance between the driving point and the heads 38L and 38R as possible. The two counter rotating capstans 36L and 36R with peripheral holes and vacuum source applied within suck the tape down against the capstans and provide tension between a head and a capstan.

The stationary vacuum pad 40 as disposed in the middle between the two capstans with one head positioned between one end of the vacuum pad and one of the two capstans permits two sets of heads 38L and 38R to be used. The heads are mounted on a precision ground plate which is pivoted such that heads may be raised for cleaning and for re-threading of the leader through the main control guide assembly.

The high performance pinch rollers 46L and 46R are located adjacent to each capstan for starting and maintaining tape motion. The central vacuum pad 40 is used for braking tape motion; thus sliding friction is established at all times on the vacuum capstans 36L and 36R except when tape is pulled over one of them by means of a pinch roller engagement. However, at this time, the opposite capstan is slipping with respect to the tape at twice the nominal tape velocity.

This sudden increase in sliding velocity does not measurably increase or decrease the coefficient of friction or the friction force at that point. Therefore, "stiction" has been eliminated at that point. Thus, the only stiction present in the guide assembly, or for that matter in the entire guide path length of tape, is present at the heads and at the central vacuum pad. This greatly eliminates mechanical vibrations or oscillations set up in the tape at the moment of impact of the pinch roller 46L or 46R. Through the use of the high performance solenoid design rapid pinch roller operation is possible without heating and high power requirements normally found in fast pinch rollers.

The roller itself is slotted and has a windowed stripped plate such that it is impossible for tape to become wrapped around this pinch roller. The pinch roller assembly also features a self seating feature which insures constant uniform pressure on the pinch roller against the entire width of the tape. This is intended to eliminate any possible bad effects which would be caused by slight misalignment of the axis of the pinch roller with respect to the periphery of the capstan. System effect is that tape stretching has been reduced to a minimum.

In forward movement, the tape is guided continuously through the control guide 35 in a path from the point below the left hand capstan 36L and continuously over the left hand capstan, over the left hand head 38L, over the vacuum pad 40, over the right hand head 38R, over the right hand capstan 36R and to a point about two inches below the right hand capstan. This guiding is achieved by the use of three precision ground flat and parallel plates, one of which is exactly ground to the nominal width of the tape and the other two of which overhang such that the tape is guided on both edges continuously. These plates are hard chrome plated and polished for long wear. Thus mechanical skew may be determined by a simple trigonometric relationship between the actual width tape and the length of the guide path. This computation involves the difference in widths of the guide and the tape and accounts for manufacturing tolerances in the tape as well.

FIGURE 6 shows a front schematic view of the important elements of the control guide assembly 35 for driving the tape 30 and transferring signal information to or from the tape 30.

The two capstans 36L and 36R are placed with centers as close as possible, leaving a minimum of space to accommodate the two head assemblies 38L and 38R. The space between the two head assemblies 38L and 38R is occupied by the vacuum pad 40, to leave a minimum length 30–T–1 of unsupported free tape between the tangent take-off point 36L–T of capstan 36L and the adjacent end 40–A of the vacuum pad 40.

Similarly a short length 30–T–2 of unsupported tape occurs between the take-off point 36R–T of capstan 36R and the adjacent end 40–B of the vacuum pad 40.

Each head assembly constitutes several individual heads spaced for several tracks on the tape. By the present arrangement, two head assemblies may be employed for staggered sets of tracks. Each individual head includes a write and a read element with separate air gaps spaced one-quarter inch along the track, and need not be described further so far as the present invention is concerned.

The important feature here is that the operating length of tape is short, within the short operating zone between the two take-off points 36L–T and 36R–T, and that the central part is supported and controlled by the vacuum pad 40, to leave only the two short lengths 30–T–1 and 30–T–2 that represent the bridging lengths across the air gaps of the two head assemblies.

As previously explained, and as shown in FIGURE 7, the vacuum pad 40 and the capstans 36L and 36R are perforated and coupled to the vacuum source 41, FIGURE 2, through suitable conduit 41–A, whereby a moving tape 30 is held to the rolling surfaces of the two capstans, to move with them, and is held to sliding friction over the highly polished low-friction surface of the vacuum pad 40.

Thus, the moving tape is mass-loaded by the vacuum as it passes over the two capstans and over the vacuum pad 40, so that no vibration can occur there. This control is effective both during steady-state operation of the tape and during transient starting intervals.

Of equal primary importance herein is the provision and arrangement of elements of the guide that will reduce the unsupported length of tape to a minimum, since it is that length of tape which will be stretched to overcome friction, and since a primary object of the invention is to provide a construction which will reduce friction to a minimum and thereby permit fast acceleration and motion. Stretching a smaller length of tape takes less time and thus decreases the starting time which would otherwise be lost and accumulate to a large time loss per day with consequent requirement for more non-used tape.

The exploded view of FIGURE 7 shows the three parallel plates 35–A, 35–B and 35–C for guiding the tape 30 through the control guide 35 and through the operating path. The two arcuate rows of passages 35–C–1 couple the drive capstans 36L and 36R to the vacuum source, and the passage 35–C–2 couples the vacuum pad 40 to the vacuum source. The three parallel plates when assembled and bolted together as in FIGURES 8 and 9, provide a rigid closely-coupled structure that holds the guide elements, including the capstans 36L and 36R and the vacuum pad 40, and the heads 38L and 38R of FIGURE 6, accurately positioned, with bearings for the drive capstans supported in the front and back plates 35–A and 35–C.

FIGURE 10 provides a perspective rear view of the back plate 35–C to show access to the vacuum passages leading to the capstans 36L and 36R and to the vacuum pad 40. A cover 35–C–2 shown in dotted outline in FIGURE 10 serves to close the back plate 35–C and to provide an entrance port for the conduit 41–A from the vacuum source. This cover 35–C–2 is similarly indicated in FIGURE 9.

The mounting for the heads consists of a pivoted bracket 81 pivotally supported from the rear of the back plate 35–C on an axis 82 parallel to the longitudinal dimension of the guide as shown in FIGURES 17 and 18. The bracket 81 may be raised to upper tilted position for access to the heads and gaps for cleaning or other purposes. In the lowered position, the bracket is moved to operating position at which a locating pin 83 locks the bracket in place to locate the head gaps always in the same position relative to the tape path.

*The cantenary basket*

In the apparatus of the present invention, an important function is performed by the provision of an accumulation of slack tape, to permit fast withdrawal of the slack tape from either basket within an extremely short time, while the related reel is being brought up to the necessary speed to feed the tape at high speed into the slack region in the basket for availability in passing through the operating region 37 of the control guide assembly 35.

If the slack tape 62 were merely accumulated as a pile in a space within a stationary frame or box, as in present conventional apparatus, the entire weight of the slack tape thus accumulated would be relatively a dead mass weighing down upon the bottom strip or bight of tape, which might be the section of tape called for by a driving capstan to be moved through the control guide assembly. The accumulated weight of slack tape would thus create a condition of static friction on the lowermost section of tape 63 as it was being withdrawn from the bottom of the pile.

An object of this invention, and one of its important features, is to take advantage between the lesser value of moving friction as compared with static friction between two surfaces, and to provide a bin construction for the accumulated slack tape in which the benefit of a lesser frictional retarding force may be derived by establishing a relatively dynamic condition in the basket to subject the entire accumulation of slack tape to an active condition of relative movement throughout the accumulated length of slack tape, by causing the serpentine loops of the slack tape to tumble and be in controlled motion without tangling, immediately upon the application of a pulling force on the bottom bight of a loop in the accumulated slack tape in the bin.

When a length of tape is subjected to considerable movement, back and forth, through the control guide and then accumulated as slack in one basket or the other, one driving operation on the tape may first call upon a top loop in the accumulated slack in one basket, as in FIGURE 4–A, and a subsequent operation may call upon the bottom loop of a pile in the same basket, as in FIGURE 4–B. The top loop will not experience as much friction as a bottom loop would. This dynamic basket is therefore especially intended and effective to reduce the friction at a bottom loop.

When a withdrawal or pulling force is applied to the tape in either bin by its associated driving capstan, the initial pulling force tilts the catenary basket suspension 60L or 60R when the pull is on the bottom loop of the pile.

As the catenary basket 60 is thus angularly tilted, with its accumulated serpentine loops 62, the entire assembly of support and accumulated slack tape loops behaves as an unstable structure. The loops shift and the center of mass of the accumulated loops shifts laterally from the normal center line of the catenary basket, and the gravity pull on the center of mass introduces a force component that tends to push the bight of the bottom loop tape section 63 in the direction of the pulling force, as in FIGURE 4–C.

Thus, by means of the dynamic basket, the type of static friction force that has hitherto existed, in resisting the operation of pulling a section of tape from a pile of accumulated slack serpentine loops, is now reduced to a minimum value of moving friction by introducing a dynamic condition of movement among the accumulated serpentine loops to establish a positive feed-back force in aid of the initial pulling force.

The amount of slack tape in a basket is regulated by controlling each reel according to the amount of slack in the related basket relative to a predetermined amount computed to be sufficient for normal operation of the transport. That amount corresponds to the amount at about mid-level in the basket.

FIGURE 5 shows the optical arrangement for ascertaining the level of accumulated slack in a basket. A light source 65 directs an incident light beam through an opening in the rear supporting wall 66 of a bin onto a polished reflective area 67–A on the rear surface of the door 67 of the bin. The reflected beam strikes a light sensor 65–A if no tape intervenes. Similarly, a light source 68 directs a beam to reach a related sensor 68–A if no tape intervenes. The top level of slack tape in the basket may thus be controlled to within the region 69 between the levels of the two sensors 65–A and 68–A, by suitable external circuitry controlled by the two sensors 65–A and 68–A to control the reel associated with that bin and basket.

Thus, each backet and reel combination is operated independently of the other basket and reel and also independently of the main drive assembly.

The great advantage in this system of operation is that the tape hangs loose in a random way in the baskets, and when controls are operated the control guide drive capstan system accelerates only a short loosely hanging loop of tape, as distinguished from the conventional vacuum chamber which has to accelerate a column of air, or instead of the conventional tension arm, which is a mechanical body, which must be moved. In the present apparatus, one second is allowed for acceleration of a full reel of one inch wide tape and one second is allowed for deceleration of same.

Each reel is driven by a high performance printed circuit D.-C. servo motor. This motor has very well defined and extremey uniform characteristics, it also has high torque to inertia ratio. Coupled to each motor by means of resilient coupling is a hysteresis brake. This last is an efficient little brake which is used to decelerate the reel and utilizes a minimum of electric power and has no slipping or sliding parts. The reel table itself is driven from the drive motor through a cog belt which eliminates slippage and provides reliable life.

*The vacuum tensioning capstan*

The vacuum tension capstans 32L and 32R, FIGURE 12, are located beneath each reel to serve the purpose of providing tension from the reel downward such that when feeding tape down into the basket fouling is prevented. A butterfly valve 32–V in FIGURE 12, is provided behind each capstan to control the vacuum such that vacuum is applied only during and for a slight period after operation of the reel motor. In this fashion, the vacuum source is left on at all times to be used with the main guide capstan assembly. The vacuum tension capstans 32L and 32R rotate continuously at a peripheral velocity somewhat higher than the maximum velocity of tape coming from a full reel of tape. This is done to assure that the tension capstan will be going faster than the tape at all times. The highly polished surface of these tension capstans will not cause undue damage to the Mylar side of the tape. The butterfly valve is provided only to further extend the life of the tape. The oxide side of the magnetic tape comes in contact with no metallic surfaces other than the head and the rotating idler rollers above the capstans. These low inertia highly polished rollers will rotate and do very little sliding and will therefore not affect the life of the tape. In any event, most tape wear has been found to occur in vacuum chambers and guide assemblies; this wear has been virtually eliminated in this system.

As shown in FIGURES 12 and 13, a vacuum capstan 32L or 32R comprises a perforated cylindrical roller 85 supported on two spider flanges 85–A and 85–B pinned to a shaft 86 rotatably supported between bearings 87–A and 87–B supported in a cylindrical housing 88 and an end closure 88–A which also supports an outboard pulley 89 at the outer end of the shaft 86. The pulley 89 may may be seen in FIGURE 2, driven by a belt 32L–B from a pulley on the shaft of drive capstan 36L.

The housing 88 supports a sealing cylinder 90 within which the perforated roller rotates. The sealing cylinder 90 is provided with an accurate window 91 to provide space for a tape 30 to engage and roll on the rotating perforated roller 85. The sealing cylinder may be of plastic or metallic material. The housing 88 is also provided with a window 92 to provide guiding space for the moving tape 30 and to provide access for the tape to the sealing cylinder 90.

The housing 88 also encloses a vacuum expansion chamber 93 beyond the space occupied by the rotating cylindrical roller 85 and the sealing cylinder 90. The spider flange 85–A is provided with openings 94 to permit air movement through the perforated roller 85 into said roller and through the openings 94 into the vacuum expansion chamber 93.

The vacuum expansion chamber 93 leads to a vacuum conduit 95 through the end closure 88–A and through a butterfly valve 95 to the general vacuum source of the apparatus through a coupling conduit 41–A. The butterfly valve 95 is operated by electrical means, not necessary to be shown here, through a circuit indicated simply as 95–A.

The sealing cylinder 90 serves to substantially close the perforations of the perforated roller 85 except those exposed at the window of the sealing cylinder to engage the moving tape 30. The load on the vacuum pump is thus kept low.

The butterfly valve serves to disconnect the vacuum effect from the capstan 32L or 32R when its associated reel is not turning and has come to a stop.

*The pinch roller device*

When the tape is to be moved through the transport, either for a recording operation or for a reading operation, or for a return movement, the appropriate pinch roller 46L or 46R will be energized to press the tape against its associated drive capstan 36L or 36R, depending on the direction in which the tape is to move. The two drive capstans 36L and 36R are rotated in opposite directions, as indicated by the associated arrows 36A and 36B.

When the tape is to be moved in the forward direction, either for writing or for reading, the appropriate magnetic heads of the two assemblies 38L and 38R will be connected to the external circuitry for the corresponding operation, and the forward driving pinch roller 46R will be energized to press the tape to the forward drive capstan 36R which will be rotating clockwise to move the tape in a forward direction. The backward drive capstan 36L will be rotating counter-clockwise and the backward pinch roller 46L will be de-energized and disengaged from the tape and capstan 36L.

When the tape is to be moved backward, either for a rerun or for a re-accumulation on its original reel 26L, the pinch roller 46L is appropriately energized by its circuitry to press the tape to the drive capstan 36L. The other pinch roller 46R will, of course, have been de-energized and restored to its original disengaged rest position, permitting the tape to release from the forward drive capstan 36R before the backward pinch roller 46L was energized.

The construction of the two pinch rollers 46L and 46R is the same, and is shown in FIGURES 14, 15 and 16. FIGURE 14 shows the front elevational view of a pinch roller as seen by the tape.

The initial or normal position of the pinch roller 46R is shown in the side sectional view of FIGURE 15. As shown in FIGURES 14, 15 and 16, the pinch roller 46R, for example, comprises a soft pressure roller 101, substantially a cylinder, supported on two bearings 103 and 105 mounted on a shaft 107 to permit free rotation of the roller 101 with respect to the shaft 107. The cylinder is provided with four spaced rings *a*, *b*, *c* and *d* each having a peripheral covering 102 of rubbery material for resilience in pressing against the tape. The shaft 107 is supported between two bushings 111 and 112 that fit in appropriate seating holes in a U-shaped supporting and actuating arm bracket 115. The shaft 107 extends through the two bushings 111 and 112 and beyond two side walls 115A and 115B of the supporting structure. The two ends of the shaft 107 are shaped with peripheral grooves 107A and 107B to receive rubber rings 120A and 120B which serve as rubber holding clamp rings to hold the shaft 107 in position against axial displacement, and to serve also as shock absorbers with the bushings 111 and 112 to absorb some of the force of impact with the peripheral rings 102 when the soft pressure roller 101 is quickly pressed against the tape.

The supporting arm bracket 115 for the soft pressure roller 101 is provided with an upward extension 115D and a boss 115F which is held tightly to a pivoted supporting block 122 by a coupling pin 124 and a compression spring 125. A snap ring washer 127 is coupled to the top end of the pin 124 and serves as a back rest for the compression spring 125 whose front convolutions seats against the upper surface of the block 122. The compression spring 125 thus pulls the boss 115F of the bracket arm 115D to seat tightly against the undersurface of the block 122 which is pivotally supported on a pivot pin 128. The compression spring 125 and the pin 124 co-operate to provide a resilient pivotal support for the supporting arm bracket 115. The compression spring 125 is of sufficient strength to assure a coupling without looseness or play.

The roller-supporting bracket 115 is provided with a back limit stop pin 130 which determines the location of the normal rest position of the soft pressure roller 101 under the influence of a return bias spring 132. The back stop pin 130 rests against the front end of the armature shaft of an electromagnet 135, which serves, when energized, to attract an armature 137, behind the magnet, to press an axial core 138 forward against the back stop pin 130 to move the stop pin 130 and the supporting bracket 115 and the soft pressure roller 101 sufficiently forward, through a small distance, to press the soft pressure roller 101 against the tape which is in turn pressed against the associated drive capstan 36R in this case, for illustration.

The pivot pin 128, for the block 122 that supports the bracket 115 for the soft pressure roller 101, is supported between two side walls 140A and 140B of a box structure 140 which serves as the housing for the pinch roller construction as a unit.

In order to prevent the tape from tending to curl around and follow the soft pressure roller 101, a tape shield 145 is disposed vertically across the front of the roller housing 140 with two rectangular windows of sufficient size to accommodate two of the four ring elements of the soft pressure roller 101 to expose two arcuate sections of the periphery of those two ring elements so they can engage the tape in pressing the tape against the drive capstan.

*Tape end marker detection*

In FIGURE 3, brief reference was made to the "load" or beginning of the operating tape 30, as brought to the operating zone of the control guide 35 by the leader 30–Z. A marker 51 of light reflective material was indicated. A similar marker 52 is disposed at the back end of the operative length of the tape 30, and a similar detector is employed for that marker.

The disposition and appearance of the detector 53 are illustrated in FIGURE 11, where the relative positions and dimensions may be seen. The light-transmitting cylinder 52 transmits the trapped light from the small lamp 58 and directs the light beam 55 onto the tape 30, from which the marker 51 reflects the light to the light sensor 54. The detector 53 and the lamp are disposed in the middle plate 35–B, over which the moving tape 30 passes in the control guide 35. That locations may be better seen now upon referring to FIGURES 7, 8 and 9.

As shown in FIGURE 7, the three plates 35–A, 35–B and 35–C are provided with horizontally aligned through passages 97 and **97–*a* for receiving a socket and a lamp corresponding to lamp 58 of FIGURE 11. In the middle plate 35–B are two vertical recesses or slots 98 and 98–*a*, on the front and on the back surfaces of said plate for receiving a detector light-transmitting cylinder 52 corresponding to that shown in FIGURE 11. Passage 97 communicates with slot 98, and passage 97–*a* communicates with slot 98–*a***. Thus, one detector may be used to detect the front tape marker, and the other detector may be used to detect the second marker.

Suitable circuitry that may then be controlled by said two detectors for indication and control purposes, and for other purposes relating to the operation of the transport, are described and claimed in a separate application, to the assignee of this application.

*Reel and bin slack control*

The operation of each reel and its associated bin to provide a proper quantity of slack is an important feature of this invention. The availability of the slack permits fast starting movement of the tape upon demand while the reel is being accelerated to sufficient speed the tape at the speed required for operation.

In operation, the reel motor is reversible as required, and a hysteresis brake is here employed. The control for the motor and brake is established by the light sources 65 and 68 and the related light sensors 65–A and 68–A at each bin. Each light source and its sensor are preferably mounted on a plate 101 shown in the left hand lower corner of the panel 25 in FIGURE 2. Each plate is adjustably positionable on suitable guides 102 and 103 to pre-fix the spacing between the plates to thereby control the dimensions of the range 69, shown in FIGURE 5, within which the top level of slack may freely float and vary without calling on the reel motor for operation.

The functional control logic system between the sensors 65–A and 68–A of bin 34–R and the related reel motor 26–RM, for example, is shown in FIGURE 19.

Three conditions may be considered. In the first condition, the tape level is low and both sensors 65–A and 68–A are lighted and excited. Clockwise or reverse operation of reel 26R, as seen from the front, is wanted to dump tape into bin 34R, provided the forward pinch roller 46L is not engaged. In the second condition, the tape level is adequate, within zone 69 of FIGURE 5, so sensor 65–A is excited and sensor 68–A is dark. Motor operation is not wanted. In the third condition, the tape level is too high, above zone 69 of FIGURE 5, and both sensors are dark. Forward counter-clockwise operation of reel 26R is wanted, to remove tape from bin 34R, provided reverse pinch roller is not engaged.

Considering the first condition, low tape level, both sensors are lighted, both transistors T*r*–1 and T*r*–2 receive negative signals and both put positive operating pulses onto the related Schmitt triggers S–T–1 and S–T–2 whose outputs are normally plus on top output terminals *a* and *c* and negative on bottom output terminals *b* and *d*. Upon operation of S–T–1 and S–T–2, polarities of *a* and *b* change, as shown in the radiant circles. Negative signals from *a* and *c*, from both Schmitt triggers S–T–1 and S–T–2 go to a Negative AND gate N–A–1 which also receives a negative pulse when forward pinch roller 46R is not engaged. Negative AND gate N–A–1 then sends an operating signal to Relay Driver RD–1 which is shown as including a pilot transistor T*r*–3 and an associated power transistor T*r*–**3*a* to close the energizing circuit to the reversing relay coil 110–*a* of reversing switch 110 to reel motor 26–RM**.

At this point another important feature of the invention is effective.

Since the reversing motors for the two reels will be called into operation hundreds or thousands of times per day, it is desirable to delay current to the motor until the relay switch has been operated.

That delay interval is established by a one-shot multivibrator 115 that is self-restoring to normal condition after the adjusted time setting of about one hundred to three hundred milli-seconds. Thus, for example, the reversing switch to the reel motor is operable within such delay interval, thereby establishing a closed circuit before current is otherwise permitted to flow by the associated circuitry.

That same delay interval multi-vibrator also serves to prevent false operations of the reel motor in case of transients, as where a moving tape loop may momentarily interrupt a light beam between a source and its sensor in the slack tape bin. When such a condition is identified as a transient, by re-establishment of actual conditions, the running of the time interval is immediately terminated by resetting the one-shot multi-vibrator to its normal rest condition.

The operating positive pulse from N–A–1 to R–D–1 held T*r*–3 open and energized or fired T*r*–3*a* to close the circuit to the reversing coil 110–*a*.

At the same time, positive pulse from N–A–1 goes to N–A–3 and to N–A–4, and both N–A–3 and N–A–4 have positive outputs. From N–A–3, positive to T*r*–5 holds T*r*–5 open and puts negative on SET terminal of delay multi-vibrator 115, which requires negative to SET. Therefore, delay multi-vibrator 115 fires and its output is negative onto T*r*–8 emitter for the delay interval and then goes positive to fire T*r*–8 which operates RD–2 to connect reel motor to operating polarity.

Thus, consider that the reversing relay switch has operated to reversing position and the delay interval is completed, the reel motor 26–RM will be energized. Reel motor 26–RM rotates reel 26R clockwise, seen from front, in normally reverse direction, to dump tape into the bin 34R to at least cover bottom sensor 68–A. Thereupon, transistor T*r*–2 stops conducting and Schmitt trigger S–T–2 returns to normal condition, and top terminal *c* of S–T–2 goes positive to put positive signal into Negative AND gate N–A–1 to develop negative output signal to fire transistor T*r*–3, which closes T*r*–3 and opens T*r*–3*a* to de-energize reversing relay coil 110–*a*, permitting motor switch 110 to be returned to normal forward position by switch spring 110–*s*.

At the same time *b* positive from S–T–1 and *d* negative from S–T–2 go to negative AND gate N–A–2, with consequent negative pulse to negative AND N–A–3 while negative pulse from N–A–1 is on N–A–3. N–A–3 negative output fires transistor T*r*–5 to put positive pulse on SET terminal of multi-vibrator 115 and on base of T*r*–10 in relay drive RD–3 to energize hysteresis brake 120. Multi-vibrator requires negative on SET to operate, and therefore does not fire.

So long as the SET terminal of multi-vibrator 115 stays energized positive, the multi-vibrator output will remain at normal positive, and base of T*r*–8 is positive. This holds input transistor T*r*–8 open in the relay driver RD–2 for the motor current. With T*r*–8 open, no current goes to the motor. This condition prevails so long as the slack tape level is in mid region with ample slack.

Considering now that the third condition has been reached, and the tape level has gone too high, then the reel motor 26–RM should rotate counter-clockwise, as viewed in FIGURE 1, to withdraw tape from the bin. Both sensors 65–A and 68–A are dark. Transistors T*r*–1 and T*r*–2 are open. Both Schmitt triggers S–T–1 and S–T–2 are de-energized and in normal condition. Their top output terminals *a* and *c* put positive signals on Negative AND gate N–A–1, and the gate negative output fires transistor T*r*–3 closed. T*r*–3*a* is then held open and the reversing relay coil 110–*a* of the motor switch stays de-energized, leaving motor switch 110 in normal forward position to energize reel motor 26–RM in forward or counter-clockwise direction, to withdraw tape from the bin.

At this time, during the third condition, the lower output terminals *b* and *d* of Schmitt triggers S–T–1 and S–T–2 have put two negative polarities on negative AND gate N–A–2, which sends negative polarity to T*r*–4 with positive polarity out to negative AND gate N–A–3, and to N–A–4, both of which already have negative polarity from N–A–1. Positive output from N–A–3 opens transistor T*r*–5 to remove positive and to put negative operating potential on SET terminal of multi-vibrator 115, and the output goes to negative immediately.

Now the time delay in multi-vibrator 115 becomes significant. Transistor T*r*–8 cannot operate until the time delay is completed and the output polarity from multi-vibrator 115 goes back to positive, which puts positive on the emitter of T*r*–8 in the relay driver RD–2 that control the current to the reel motor. T*r*–8 still has negative on its base and thereupon fires to operate its associated transistors T*r*–8*a* to supply current to reel motor 26–RM. The motor operation pulls tape out of the bin to expose the top light sensor 65–A, whereupon AND gate N–A–1 switches output polarity to negative to N–A–4 to fire T*r*–6 and reset the multi-vibrator to cut-off the motor 26–RM.

During the various operations of the motor and tape movement, a transient condition may occur that would create an instantaneous apparent condition other than the actual control or operating condition. The time interval in the multi-vibrator is sufficient to delay change in operation for a time sufficient to enable the transient condition to clear itself.

If, while the motor is dumping tape into the bin, the top light beam should be intercepted, thus creating a condition of dark on the top sensor, which would create improper circuitry conditions, the multi-vibrator 115 would be momentarily operated but reset through N–A–4 and T*r*–6 before improper reverse-type operations could become effective. Thus, the multi-vibrator serves both to delay current delivery to the motor until the relay contacts are properly closed, and also to delay an operation improperly indicated by a transient condition, until sufficient time has elapsed to permit such transient to pass.

The multi-vibrator serves thus to clear transients in the tape movement in the bin and also both transient and steady faults in related equipment. A protective bus 125 receives a negative pulse from any number of predetermined detectors or sensors of faulty conditions, and operates transistor T*r*–9 to energize the hysteresis brake 120 and the multi-vibrator 115 to hold the motor circuit open.

Thus, by the construction of the transport as shown, and the system for directly controlling the slack tape and the reels, a transport system for tape generally has been disclosed that is capable of fast acceleration, deceleration and operation, with the resultant advantages of saving of time and tape.

The relatively close disposition of the drive capstans limits the operating length of tape to be controlled to a small dimension. As previously specified, the length of unsupported tape has been reduced to three-eighths of an inch. By closer positioning of the drive capstans, even that dimension could be still further reduced. The beneficial result of that small dimension is that a correspondingly small length of stretching must be done to start the tape from rest, as previously stated. Thus, less time and less tape are required for the starting and stopping operations that are functionally useless.

For illustrative purposes of an application of the apparatus, the tape has been shown as magnetic with transducer heads to operate on the tape. Other forms of tape and other types of operating devices to co-operate with the tape could be used where high speed of operation was desired.

It will be apparent that modifications and changes could be made without departing from the spirit and scope of the invention.

I claim:

1. A tape drive system for use in a tape transport, said system comprising a supporting bracket having a rigid supporting wall with a front planar surface with openings through the wall to communicate with a hollow chamber within said bracket to be evacuated by connection to a suitable vacuum source;

a pair of closely spaced driving capstans each having a perforated peripheral cylindrical surface and a hollow internal chamber;

a pair of pinch rollers with each pinch roller located adjacent to one of the driving capstans and having the tape located intermediate each of the pinch rollers and its corresponding driving capstan;

supporting means for rotatably supporting said driving capstans on said bracket with the internal chambers of each of said capstans in continuous communication with the hollow evacuated chamber of said bracket;

guide means on said bracket for supporting and guiding a tape in movement between the two capstans, said guide means having a perforated outer surface to guide the tape, with the perforations in said outer surface in continuous communication with said hollow chamber within said bracket;

and means operatively coupled to the pair of pinch rollers for providing selective engagement of individual ones of the pinch rollers with its corresponding driving capstan.

2. A tape drive system, as defined in claim 1, including a transducer;

a pivotal support for said transducer to permit pivotal shifting of a transducer to and from operative position adjacent the path of tape movement;

and means on said supporting bracket to provide a positioning reference for accurately re-positioning the transducer after shifting said transducer away from operative position.

3. A tape transport system including a pair of vacuum capstans on spaced axial centers for supporting a tape to be moved over and with capstan surfaces;

a source of vacuum;

a pair of pinch rollers with each pinch roller located adjacent to one of the vacuum capstans and having the tape located intermediate each of the pinch rollers and its corresponding vacuum capstan;

means operatively coupled to the pair of pinch rollers for providing selective engagement of individual ones of the pinch rollers with its corresponding vacuum capstan;

a stationary element having a vacuum surface substantially in the path of movement of the tape and to be held to sliding motion over such surface by the vacuum, the stationary element being disposed and dimensioned to leave a short space to the adjacent capstan within which the tape will be unsupported;

and means operatively coupled to the pair of vacuum capstans, the stationary element, and the source of vacuum to continuously couple the source of vacuum to each of the pair of vacuum capstans and the stationary element.

4. A tape transport system, as in claim 3, including transducing means for performing an operation on a moving tape.

5. A tape transport system as in claim 4, including means for supporting the transducing means at a length of unsupported tape.

6. A system for providing movement of a tape medium, including a pair of vacuum capstans for supporting the tape medium;

means for rotating each of the vacuum capstans in opposite directions;

a source of vacuum;

means operatively coupled to the pair of vacuum capstans and the source of vacuum for continuously coupling the source of vacuum to each of the pair of vacuum capstans;

and means operatively coupled to the tape medium and the pair of vacuum capstans for providing movement of the tape medium in one of two opposite directions by frictionally engaging the tape medium against one of the pair of vacuum capstans to provide a pulling force at the one of the pair of vacuum capstans greater than the restraining force at the other of the pair of capstans.

7. A system for providing movement of a tape medium, including a pair of vacuum capstans for supporting the tape medium;

means for rotating each of the vacuum capstans in opposite directions;

a stationary element having a vacuum surface for supporting the tape medium and with the stationary element located intermediate the pair of vacuum capstans;

a source of vacuum;

means operatively coupled to the pair of vacuum capstans, the stationary element and the source of vacuum for continuously coupling the source of vacuum to each of the pair of vacuum capstans and the stationary element;

and means operatively coupled to the tape medium and the pair of vacuum capstans for providing movement of the tape medium in one of two opposite directions by frictionally engaging the tape medium against one of the pair of vacuum capstans to provide a pulling force at the one of the pair of vacuum capstans greater than the straining force at the other of the pair of capstans.

8. A system for providing movement of a tape medium, including a pair of vacuum capstans for supporting the tape medium;

means for rotating each of the vacuum capstans in opposite directions;

a pair of pinch rollers with each pinch roller located adpacent to one of the vacuum capstans and having the tape medium located intermediate each of the pinch rollers and its corresponding vacuum capstan;

a source of vacuum;

means operatively coupled to the pair of vacuum capstans and the source of vacuum for continuously coupling the source of vacuum to each of the pair of vacuum capstans;

and means operatively coupled to the pair of pinch rollers for providing selective engagement of individual ones of the pinch rollers with its corresponding vacuum capstan.

9. A system for providing movement of a tape medium, including a pair of vacuum capstans for supporting the tape medium;

means for rotating each of the vacuum capstans in opposite directions;

a pair of pinch rollers with each pinch roller located adjacent to one of the vacuum capstans and having the tape medium located intermediate each of the pinch rollers and its corresponding vacuum capstan;

a stationary element having a vacuum surface for supporting the tape medium and with the stationary element located intermediate the pair of vacuum capstans;

a source of vacuum;

means operatively coupled to the pair of vacuum capstans, the stationary element and the source of vacuum for continuously coupling the source of vacuum to each of the pair of vacuum capstans and the stationary element;

and means operatively coupled to the pair of pinch rollers for providing selective engagement of individual ones of the pinch rollers with its corresponding vacuum capstan.

References Cited by the Examiner

UNITED STATES PATENTS 973,945 10/1910 Lewis ________________ 226—45

(Other references on following page)

UNITED STATES PATENTS

| | | | |
|---|---|---|---|
| 2,044,033 | 6/1936 | Von Heising | 179—100.2 |
| 2,287,768 | 6/1942 | Eckstein | 226—1 |
| 2,551,845 | 5/1951 | Lindsay | 179—100.2 |
| 2,560,254 | 7/1951 | Shickel | 179—100.2 |
| 2,563,850 | 8/1951 | Lindsay | 170—100.2 |
| 2,731,262 | 1/1956 | Morrow | 226—1 |
| 2,742,536 | 4/1956 | Uritis | 179—100.2 |
| 2,831,678 | 4/1958 | MacNeill | 226—50 |
| 2,837,330 | 6/1958 | Lawrance et al. | 226—95 |
| 2,866,637 | 12/1958 | Pendleton | 226—95 |
| 2,897,370 | 7/1959 | Sauter | 250—219 |
| 2,911,483 | 11/1959 | Dopieralski | 179—100.2 |
| 2,943,852 | 7/1960 | Quirk | 226—50 |
| 2,984,398 | 5/1961 | Chalmers | 226—95 |
| 3,002,670 | 10/1961 | Namenyi-Katz | 226—176 |
| 3,002,671 | 10/1961 | Brumbaugh et al. | 226—176 |
| 3,019,346 | 1/1962 | Laycak | 250—219 |
| 3,026,634 | 3/1962 | Irazoqui | 242—55.12 X |
| 3,027,059 | 3/1962 | Streeter | 226—45 |
| 3,032,284 | 5/1962 | Uritis | 242—55.12 |
| 3,044,725 | 7/1962 | Gams et al. | 242—55.12 |
| 3,071,332 | 1/1963 | Dain et al. | 226—95 X |
| 3,075,679 | 1/1963 | Wadey | 226—50 X |
| 3,097,778 | 7/1963 | Pendleton | 226—95 |

FOREIGN PATENTS

| | | |
|---|---|---|
| 872,441 | 7/1961 | Great Britain. |

MERVIN STEIN, *Primary Examiner.*

HARRISON R. MOSELEY, RUSSELL C. MADER, *Examiners.*